United States Patent [19]

Gilham

[11] Patent Number: 4,757,532
[45] Date of Patent: Jul. 12, 1988

[54] SECURE TRANSPORT OF INFORMATION BETWEEN ELECTRONIC STATIONS

[75] Inventor: Dennis T. Gilham, Ongar, United Kingdom

[73] Assignee: Alcatel Business Systems Limited

[21] Appl. No.: 853,928

[22] Filed: Apr. 21, 1986

[30] Foreign Application Priority Data

Apr. 19, 1985 [GB] United Kingdom ............... 8510096

[51] Int. Cl.[4] .............................................. H04L 9/00
[52] U.S. Cl. ........................................ 380/23; 380/21; 380/25
[58] Field of Search ................. 364/200, 900; 178/22.08, 22.09; 380/23, 25, 21, 46, 50; 235/382.5

[56] References Cited

U.S. PATENT DOCUMENTS

| | | | |
|---|---|---|---|
| Re. 31,875 | 4/1985 | Check, Jr. et al. | 364/900 |
| 3,664,231 | 5/1972 | Hanson | 70/292 |
| 4,093,999 | 6/1978 | Fuller et al. | 364/900 |
| 4,281,216 | 7/1981 | Hogg et al. | 380/21 |
| 4,335,434 | 6/1982 | Baumann et al. | 364/464 |
| 4,365,293 | 12/1982 | Holdz | 364/200 |
| 4,421,977 | 12/1983 | Kittredge | 364/900 |
| 4,453,074 | 6/1984 | Weinstein | 178/22.08 |
| 4,507,744 | 3/1985 | McFiggans et al. | 364/464 |
| 4,629,871 | 12/1986 | Scribner et al. | 235/382.5 |

OTHER PUBLICATIONS

"Cryptography and Data Security", by D. E. R. Denning, 1982.

Primary Examiner—Salvatore Cangialosi
Attorney, Agent, or Firm—Shoemaker and Mattare, Ltd.

[57] ABSTRACT

An information transport system for conveying information between a franking meter machine and a post office equipment includes a unit having a non-volatile read/write memory which may consist of an EEPROM which can be transported between the meter and the equipment. When the unit is inserted in the franking machine a transaction code is verified by comparison with a registered code and information transfer is effected. The machine then generates a new code and stores it in a register. Upon return of the unit to the post office, the equipment responds to the transaction code stored in the unit to generate a new code corresponding to the new code generated and stored in the meter machine.

12 Claims, 6 Drawing Sheets

SECURE TRANSPORT OF INFORMATION BETWEEN ELECTRONIC STATIONS

TECHNICAL FIELD

This invention relates to the secure transport, for example, by post, of information, such as franking machine credits and associated data, between electronic stations, such as a franking meter at one end and post office equipment at the other end. While the system is particularly described below in relation to a franking meter system it is obvious that the system can readily be adapted to other purposes for use by businesses, banks and so forth.

DESCRIPTION OF THE PRIOR ART

One of the limitations of normal franking machines from both the customer and the Post Office's point of view is the need to take the machine to a Post Office in order to have credit entered. The introduction of electronics has helped to reduce the weight of the machines but the time taken to obtain new credit is still much the same. In addition the Post Office recording procedures are manual and must be re-handled to enter into a data processing system.

At present two alternative systems available in the United Kingdom are the meter telephone resetting system and the value card system. The former makes use of the national telephone system for communication between the franking machine user and a computer data centre. So far as the user is concerned, this has the disadvantages that in currently available mechanical franking meters a special attachment has to be mounted, it involves extra cost, the credit can only be updated by a preset amount, there is need to open a special bank account in conjunction with the suppliers of the system and there is no possibility of going, as an alternative, directly to the Post Office for recrediting. So far as the Post Office is concerned, there are the disadvantages that it receives the money from the supplier of the apparatus instead of from the users, while having no direct control of the complicated procedure or recorded information. The system involves large capital investment and high running costs requiring a large population of franking machine users to break even.

So far as the value card system is concerned, for the user it has the disadvantages of preset amounts of credit update and the necessity to surrender used value cards prior to the puruchase of new cards. From the point of view of the Post Office there is lack of scope for security enhancement, limited information available and incompatibility with a fully developed digital system. From the point of view of the manufacturer there is the extra cost to print control information on the value card and the fact that the system is not universally accepted.

SUMMARY OF THE INVENTION

A main object of the present invention is to provide a franking machine system that involves substantially fewer disadvantages than the two aforesaid systems.

According to the invention, an information transport system comprises first and second stations each for electronically writing into and reading from a unit having an electronic circuit including a non-volatile read-/write memory and connection means whereby binary encoded information can be written into and read from the memory at each of said stations, the information including an encoded transaction identity (TID code), and the unit being formed for mounting at each station with the connecting means in engagement with corresponding connecting means at the station, the first station being arranged to receive the unit with a first encoded TID and other information from the second station where a new TID code for the next transaction has already been generated within the second station and registered securely therein and the first station being further provided with means for decoding the first TID code and other information and independently generating a new TID code the same as that already registered in the second station and for revising the other information encoded in the unit, whereby when the unit is returned to the second station means therein can verify the new TID code by comparison with that already registered in the second station, the second station further being provided with means for revising said further information prior to the return of the unit to the first station. Advantageously, in each station the means for generating the next TID code may be a linear feed shift register (LFSR). In addition each station may be furnished with means for decrypting the information received by way of the unit and encrypting the information sent by way of the unit, the decryption and encryption being by digital codes that are the same in each station. Means for adding and removing parity may be provided at each station to check for any errors.

BRIEF DESCRIPTION OF THE DRAWINGS

In order that the invention may be clearly understood and readily carried into effect, a postage meter credit resetting system will now be described, by way of example, with reference to the accompanying drawings, in which.

DESCRIPTION OF PREFERRED EMBODIMENT

The plug-in unit 18 of FIG. 1 when ready to be used by a subscriber is delivered, for example, by post, from a Post Office with a recorded credit update and other information described below registered in an electrically erasable programmable memory a form of non-volatile read/write memory. The unit 18 is plugged into a franking meter 19 (FIG. 3) for the registered credit update and other data to be transferred to the franking meter. This franking meter is substantially as described in patent specification GB 2079223 but modified as described below to accept the plug-in unit. Then, at an appropriate time the plug-in unit can be sent back for insertion in the post office equipment with various data derived from registers in the franking meter to be registered in the equipment. The credit and other data carried by the unit can then be updated and the unit thereupon sent again for insertion in the franking meter.

Figure 1:
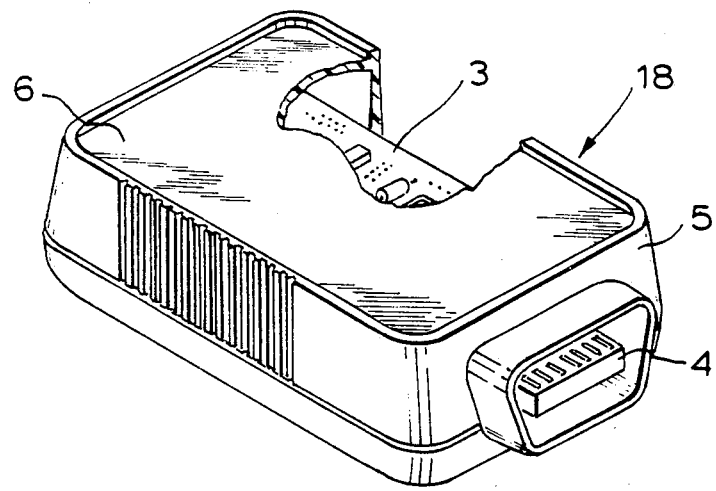
FIG. 1 is a perspective view of a plug-in credit transfer unit for use in a postal franking system.
Figure 2:
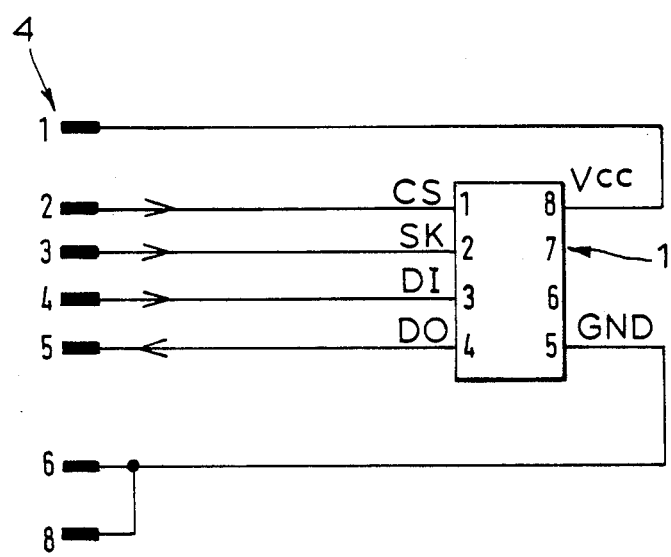
FIG. 2 is a basic electrical circuit diagram including the unit of FIG. 1.

As shown in FIGS. 1 and 2, the electronic elements constituting and associated with the memory are mounted on a printed circuit board 3, the electronic signals being carried to a plug-in connector 4. The electronic elements are contained in a housing 5 of plastics alternatively of metallic materials which are invisibly secured. The dimensions of the housing (length × width × height) are typically 70×45×15 mm. Surfaces 6 are formed at the top and bottom of the housing to allow labels to be adhered for addressing to the post office and returning to the subscriber.

As shown in FIG. 2, the non-volatile memory 1 consists of a National 16×16 bit EEPROM (electrically erasable programmable read only memory) type NMC 9306N which allows data to be transferred serially. Although the number of data writes to an EEPROM is limited to about ten thousand, if the plug-in unit is used as frequently as once per week and assuming only one write to each memory location in a transaction this would still exceed the life of the plug-in unit. Also, data is retained in the memory with no power applied for over ten years. Memories having a greater density than 16×16 bits can readily be used, if need be, when these become commercially available.

The serial nature of the chosen EEPROM allows the franking meter to be provided with an interface for the plug-in unit to be used which has a minimum number of connections. This reduces the amount of circuitry in the franking meter and increases the security of the data in the plug-in unit because no address or data line is directly accessible to the connector. The signals (FIG. 2) required for the memory, in addition to a 5 volts supply and ground connection, are a chip select CS signal for selecting the memory, a serial clock SK, a data-in DI signal, the data being clocked in synchronism with the serial clock and containing address, mode of operation and data to be stored, and a data-out DO signal. Once the address is clocked into the data-in connection, the data to be read is clocked out in synchronism with the serial clock.

Although this type of memory only requires six connections, a 14-way connector is used as this simplifies the design of the franking meter when considering future accessories. The chosen connector can be used for greater than one thousand insertions before its performance deteriorates significantly. This is adequate for the franking meter and plug-in unit itself. However, as the post office equipment could accept several plug-in units in one day, the number of insertions can need to be much greater, so other connectors for example zero-insertion force types can with advantage alternatively be used.

It will be appreciated that the plug-in unit is conditioned by the post office equipment always to be associated with one franking meter only. It is under power when connected to that franking meter or to the post office equipment. The plug-in unit is conditioned so that it cannot be used with any other franking meter whilst in service with its own meter and once the franking meter has been updated with credit, the plug-in unit cannot be reused until reset with fresh credit and the conditioning is also updated by the post office equipment. Thus mere duplication of the plug-in unit and its contents is of no value in an attempted fraud. Also a suitably obscure code is used, as described below, to prevent alteration of the credit or reuse of the credit after the franking machine has been updated. The franking machine and post office equipment are arranged so that data loss or corruption can be detected either at the franking meter or at the post office equipment.

Figure 3:
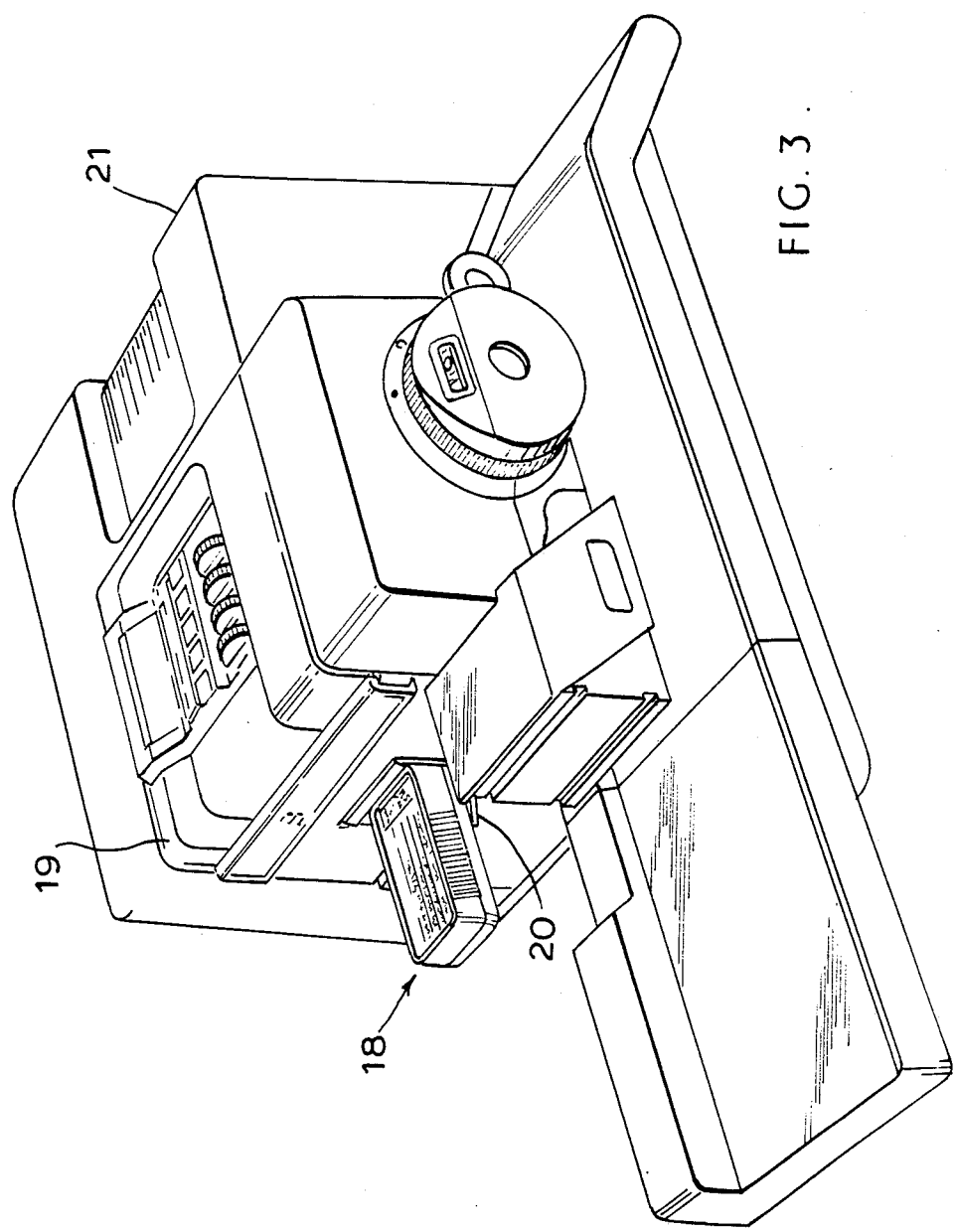
FIG. 3 is a perspective view of a franking meter with the unit of FIG. 1 mounted thereon.

Referring to FIG. 3, when the plug-in unit 18 is removed from the franking meter 19, a hinged door 20 springs up to cover the connector in the franking meter to give it mechanical protection. The connector in the franking meter is soldered directly to an interface printed circuit board described below. This, in turn, is positioned between the connector side of the franking meter and an internal control printed circuit board for controlling the franking meter. A cable carries the signals from the interface printed circuit board to a connector on a display printed circuit board in the franking meter. A microprocessor on the control printed circuit board is connected directly to the connector on the display printed circuit board.

Figure 4:
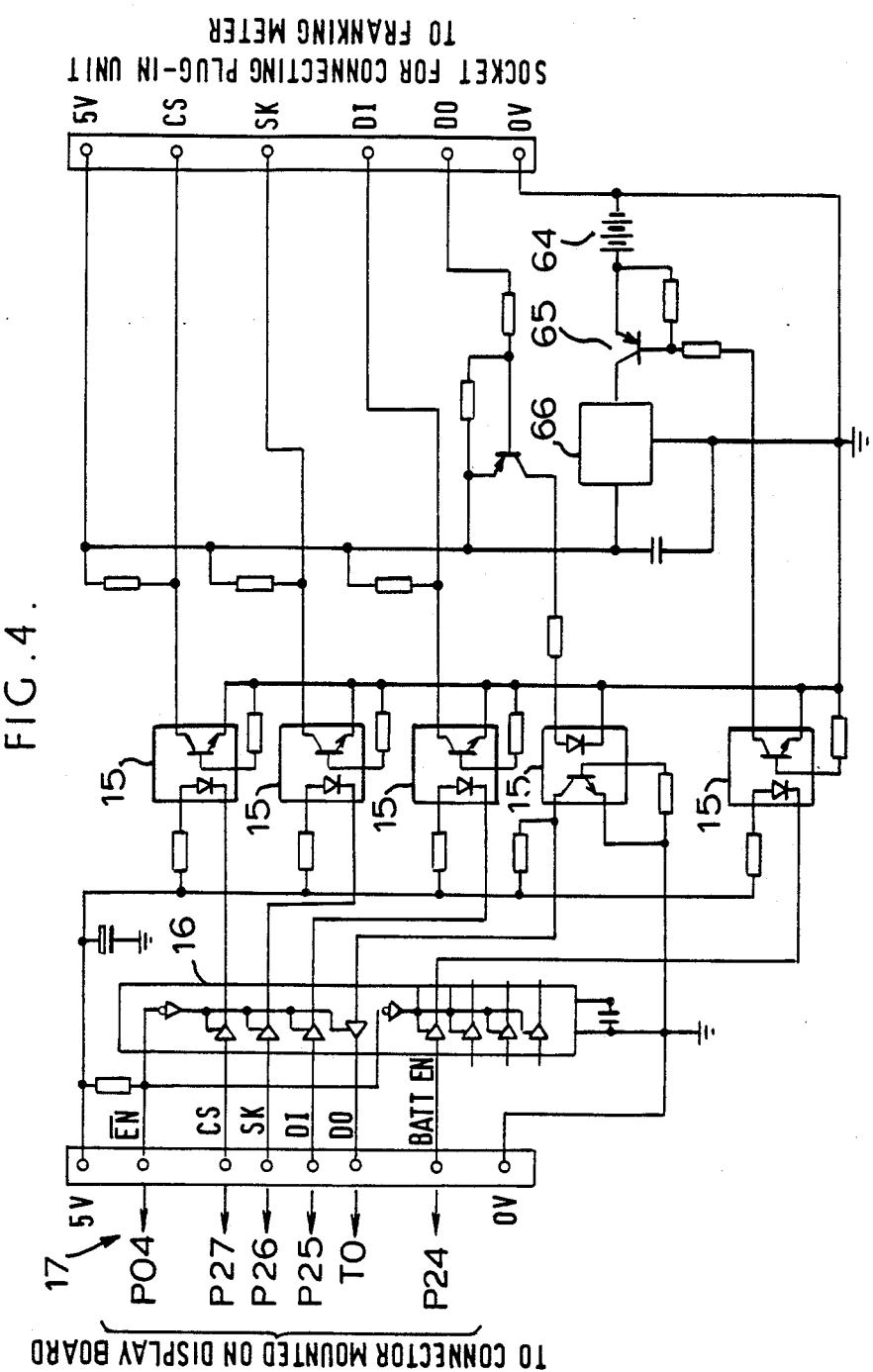
FIG. 4 is a diagram of an interface circuit in the franking meter of FIG. 3 for receiving the unit of FIG. 1.

The arrangement of the interface printed circuit board is shown in FIG. 4, the connector for the plug-in unit being shown on the right hand side of this Figure. The main function of the interface is to form electrical isolation between the franking meter circuit and the plug-in unit's memory. This is done by means of optical isolators 15 (type 4N25), in the four main signal paths: chip select (CS); serial clock (SK); data in (DI) and data out (DO) thereby providing protection against high electrical voltages applied externally at connector 2 contained in the franking meter. Each path also has a Schmitt Trigger buffer with tri-state output 16 (type 74LS244), in order to buffer the microprocessor ports in the franking meter to the optical isolators, and an enable signal (EN) is provided to enable these buffers when the plug-in unit's memory is to be accessed. The four signals and enable are connected directly to a group 17 of microprocessor ports P27, P26, P25 TO and PO4, as shown in FIG. 4 protection against erroneous access to the memories contained in the franking meter is provided by the secure logic control of the microprocessor as described below.

The four signals are under software control, and enable data to be transferred to and from the plug-in unit's memory by means of the DI and DO signals. These serial signals are synchronised to the falling edges of the clock SK pulses, and the plug-in unit's memory is enabled when CS is high. Before a read or write, at least one instruction must be sent to the memory via DI, containing 9 bits (synchronised to SK). The instructions are Read, Write, Erase Register, Erase/Write Enable, Erase/Write Disable and Erase All Registers, and the first three instructions use four of the 9 bits to address one of the 16 bit words.

To read from the plug-in unit's memory, a Read instruction is first input on the DI line, (specifying a 16 bit register) and the next 16 SK pulses clock the data out of the DO line. To write to the memory, it is first necessary to send an Erase/Write Enable instruction on the DI line, followed by Erase Register instruction (specifying a 16 bit register), followed by a write instruction, (specifying the same register). During the next 16 SK pulses, data is input on the DI line, and this may be followed by an Erase/Write Disable instruction in order to protect against further erasures or writes. The complete memory may be erased by means of the Erase All Registers instruction provided it is preceded by an Erase/Write Enable instruction.

As the plug-in unit's memory is powered by means of volts when plugged into the franking meter, this implies that a 5 volt signal must be provided on the meter connector for the plug-in unit. All signals on this connector are exposed to the user, so if this 5 volts is the same as the internal supply voltage, it is conceivable that damage could be done to the existing hardware in the franking meter either by accidentially or (in the case of fraudulent attempts) deliberately applying high voltages to the connector. Whereas the signal paths are protected by the optical isolators, the supply cannot be protected in this way. Therefore, referring to FIG. 4 which shows the circuit of the franking meter interface to the plug-in unit (trade designations and electrical values of certain of the elements being indicated in this figure) an independant lithium cell 64 is used to power the plug-in unit's memory (only when the plug-in unit is inserted), via a regulator 66. A transistor 65 provides a means of switching the battery power on and off under software control, that is, when data is to be transferred to or from the plug-in unit for which the battery is switched on. The battery is turned off at all other times. This maximises the battery life which is estimated to be in excess of 10 years. The base of the switching transistor is connected to the microprocessor in a similar manner to the four signals described above, that is, via a fifth optical isolator 15, or Schmitt Trigger buffer 16 and finally to the microprocessor part p24 of the group 17. 20 Another modification of the aforesaid franking meter of GB 2079223 to accommodate the plug-in unit is the replacement of the microprocessor which contains 2K bytes of ROM and 128 bytes of RAM by a microprocessor having twice the memory desntiy, for example, Intel's 8050 with 25 4K bytes of ROM and 256 bytes of RAM.

The ranges available for the various functions in the memory of the plug-in unit are 40 (minimum 28) bits for the credit c, 40 bits for the tote t, 40 (minimum 28) bits for the items i, 32 bits for the transaction identification code TID (encrypted), 32 bits for the credit update $\Delta C$ (encrypted), 8 bits for the status (including fault condition), a maximum of 40 bits for parity and 16 bits for plug-in unit identification. A maximum of 248 bits is, therefore, required. It should be explained that tote t is the total value accumulated by the franking meter, items i is the total number of mail items that have been franked by the franking meter. Status refers to the state of the unit at any instant during its cycle of operation. Parity may be of the type described with reference to Table 3 in the said GB 2079223.

Figure 5:
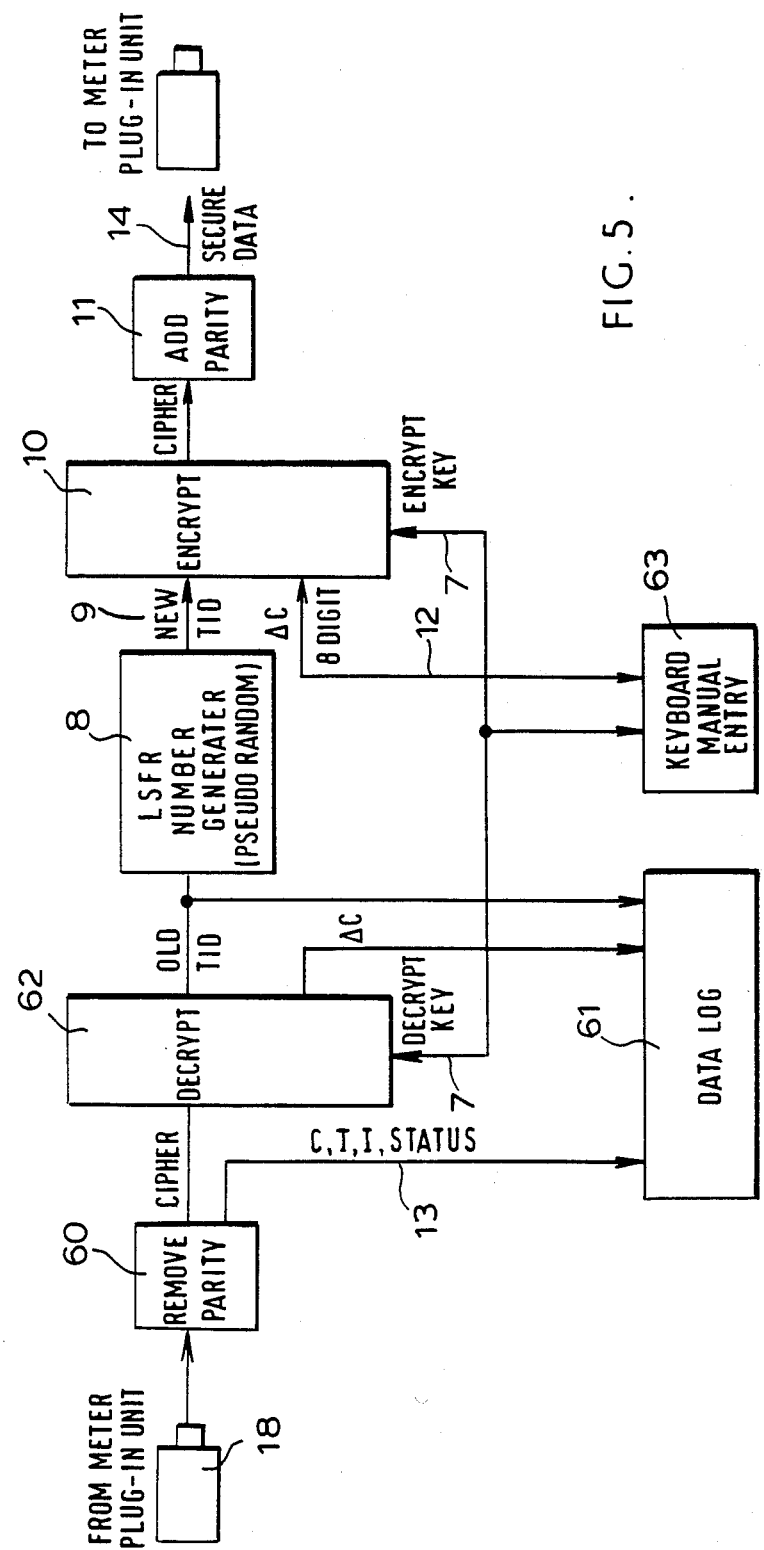
FIG. 5 is a block diagram of post office equipment protocol for accepting the unit of FIG. 1 and reading and writing therein credit and associated data.

The post office equipment protocol will now be described with reference to FIG. 5. This equipment is a modification of that used for the aforesaid meter of GB 2079223 when required to access the meter registers direct. When the plug-in unit 18 is mounted into the post office equipment, data in the plug-in unit's memory is transferred to the post office equipment where parity bits are removed 60 and the status is checked so that, if there are no faults, the credit, tote and items data 13 are fed to a data log 61 for record keeping purposes (e.g. for later transfer to printer, terminal or disc).

The encrypted TID code and credit update, $\Delta C$, both with parity removed pass from the remove parity module 60 to decryption coding module 62 where this transaction identification code is decrypted using an eight digit Post Office code 7 peculiar to a given franking meter fed from a keyboard 63. This used TID code together with the used credit update $\Delta C$ (decrypted) are fed to the data log 61. The used TID code then passes to a linear feed shift register LFSR 8 which is a 24 bit ($16 \times 10^6$ states) pseudo random number generator which changes the transaction identification to a new TID code 9. This code is changed in this way at the start of every transaction and ensures that the plug-in unit cannot be reused until fresh credit is bought and ensures that the plug-in unit cannot be used with any other franking meter by virtue of the fact that the non-volatile RAM in the franking meter stores data peculiar to that meter by way of the Post Office code. The size of the LFSR need only be such as to minimise the probability of fraud by writing random codes into the plug-in unit and as 24 bits give a probability of approximately 1 in $16 \times 10^6$ this size is considered adequate.

The new TID code 9 together with the new credit update $\Delta C$, pass to an encryption coding module 10 where the data block thus formed is encrypted using the 8 digit Post Office coding 7 previously entered at the keyboard 63. A standard encryption coding is used, such as the F.I.P.S. data encryption standard. The data encryption standard has to be high enough to prevent the data in the plug-in unit from being altered or extracted by fraudulent intent. A check is provided to ensure that the new credit update $\Delta C$ is within specific upper and lower limits.

The signal output from the encryption coding module 10 goes to an error coding module 11 which is a single cross-parity error detection system, where up to three zeros in a data block are detected. This is adequate for recording the encrypted TID and credit codes. Probability against fraud has already been ensured by an adequate number of bits in LFSR so that a high level of error coding would serve no further purpose.

The output 14 from the error coding module 11 is fed to the plug-in unit which is then posted to the user who inserts it into his meter. The franking meter reads and verifies both the new TID code and the credit update. The franking meter decrypts the TID code and compares it with the expected value, stored in the meter. If the values disagree, an error condition is set up and a limited number of repeat entry attempts are allowed. If the values agree the franking meter writes the current values of credit, tote, items and status to the plug-in unit and verifies the transfer. Finally, the updated credit and the next TID code generated by a LFSR acting similarly to that in the post office equipment are registered in the franking machine. This new TID code is not passed on to the plug-in unit which receives the same new code when it gets to the post office equipment later to be compared with the new code already registered in the franking machine.

The protocol described above has been designed to maintain a high level of security against fraudulent attempts, even assuming the possibility of accessing data in the plug-in unit's memory. However, should a fraudulent attempt also involve breaking the seals of the franking machine in order to gain access to the software programme stored in the microprocessor, and assuming a disassembly of the code is possible, all security for transactions on other machines rests on knowledge of the Post Office code, as this is the only "unknown" that is different for all meters. Let the Post Office code be an 8-digit number, then assuming the user is allowed up to 50 attempts of entering credit, the probability of determining this code is 1 in $2 \times 10^6$. The Post Office may request a 6-digit code in order to make this system compatible with other available systems, but the protocol will allow up to an 8-digit Post Office code.

Figure 6:
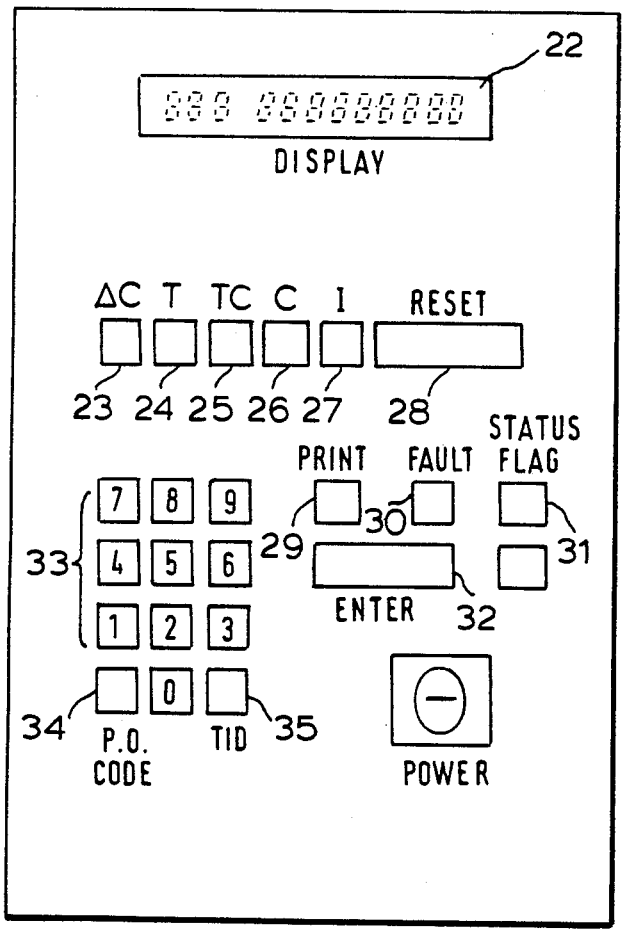
FIG. 6 is a plan of a front panel in post office equipment such as that of FIG. 5.

FIG. 6 is a schematic diagram of a front panel layout suitable for one form of the post office equipment. It consists of a row of 12 seven-segment displays 22 and a set of pushbuttons 23–35, labelled as shown. When the plug-in unit is inserted, selection of "T", "TC", "C" or "I" 24–27 displays, either Tote, Tote+Credit, Credit or Item registers (respectively), as read from the plug-in unit. The initial value of TID can be input to the plug-in unit by means of selecting "TID" 35 followed by the required value on the numeric keyboard 33 followed by "Enter" 32. The Post Office code can be entered by selecting "P.O. Code" 34 followed by the required value, followed by "Enter", and similarly the Credit Update can be entered by initiating the sequence with "ΔC" 23. Similarly, should it be necessary to update Tote, Credit or Items within the plug-in unit, this can be done by pressing T, C or I (respectively) followed by "Reset" 28 followed by the required value, followed by "Enter". The Status Flags can be displayed by selecting "Status Flag" 31 and may be altered by following the selection with "Reset", new value and "Enter". Selection of "Print" 29 causes all the data in the plug-in unit to be transferred to the printer interface.

It is possible to connect a terminal and data storage medium and to display the data on the terminal's visual display unit VDU, and to transfer, if desired, to a disc, by means of commands input via the terminal's keyboard. When the plug-in unit is first plugged into post office equipment, the software checks the parity and data for errors, and if any errors have occurred, the display indicates a fault condition. It is possible to attempt data retrieval by selecting "Reset" followed by "Fault" 30 and the result will be indicated on the display.

Figure 7:
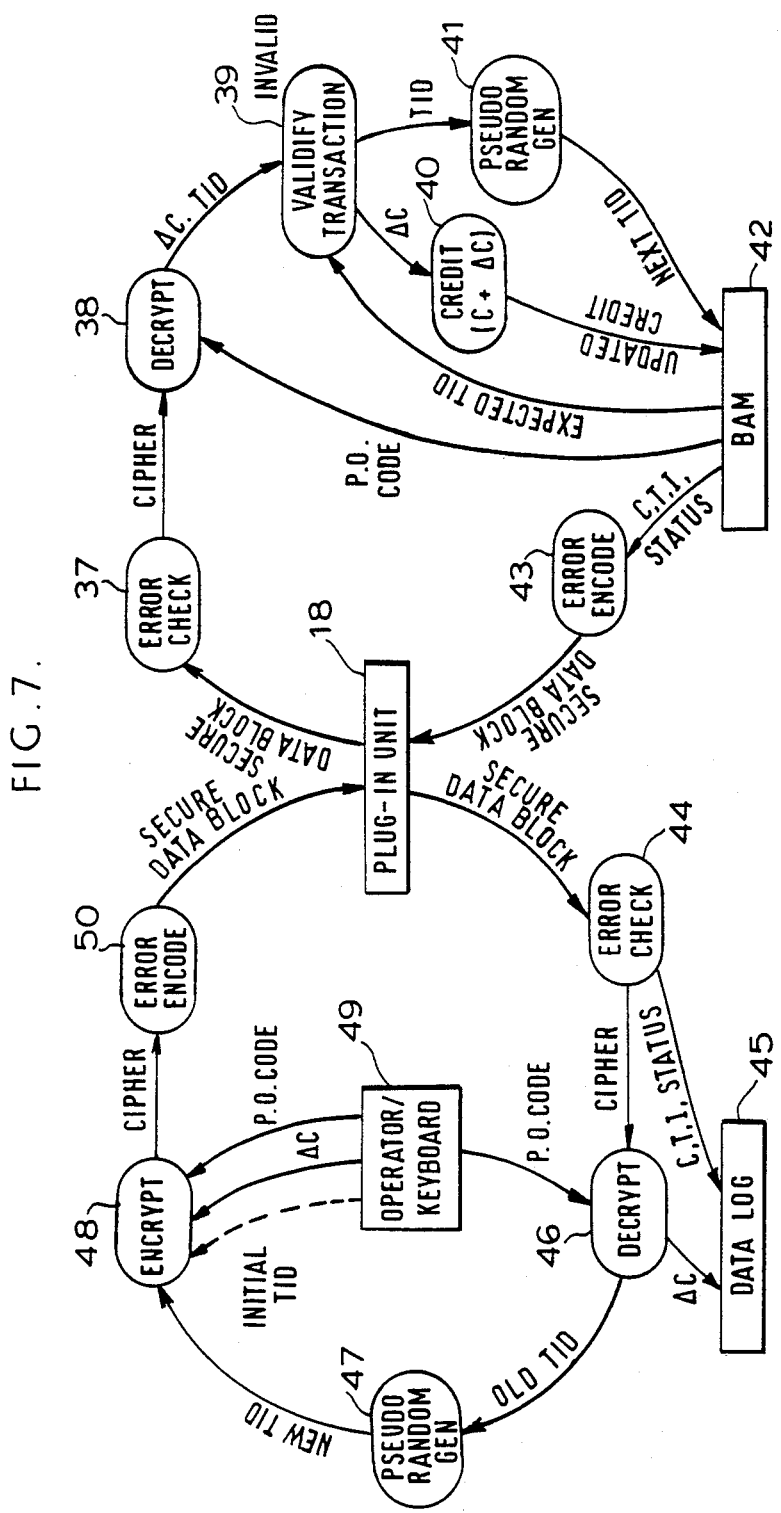
FIG. 7 is a schematic diagram showing the arrangement of software used in the franking meter of FIG. 3 and the post office equipment of FIG. 5.

The software for the system will now be described with reference to FIG. 7. The majority of the existing software for the operation of the franking meter described in the aforesaid GB 2079223 remains intact and the routines needed for the plug-in unit 18 are additional.

When the plug-in unit 18 is inserted into the meter, the user may select the keys "CL" simultaneously with "C" after which insertion is detected by reading a defined plug-in unit's memory address which has some known constant data stored. Absence of this data returns the software to the standard meter routines, but when presence is detected the remaining data is read from the plug-in unit and parity is checked for errors 37. If an error occurs the software returns to the standard meter routine, but correct data is indicated by the sign cPAc on the display followed by the credit update ΔC, unless the credit has been used, in which case zero is displayed.

If the user now wishes to transfer the credit to the meter he selects the "upper function" key simultaneously with "C", when the plug-in unit's data is read again, and checked for errors, as before. Again, the software returns to the meter routines if an error is detected, otherwise the encrypted TID code and ΔC are combined with the P.O. code stored in the franking meter 42 to form the decrypted TID code and ΔC 38. The expected TID (stored in the franking meter) is compared with the TID just derived, and if different, the transaction is terminated 39. This condition will be flagged on the display, and if on repeating the transaction the condition is reproduced, the plug-in unit will have to be returned to the post office for checking on the post office equipment.

On successful comparison, it is now possible to:

(a) Update the credit register by the amount ΔC 40 and store it in a store 42 which is a battery energized RAM.

(b) Generate a new TID by applying a LFSR (linear feed shift register) 41 similar to that in the post office equipment and storing the new TID in the store 42.

(c) Transfer error encoded Credit, Tote, Items and Status to the plug-in unit 18 verifying that the data has been written correctly 43.

The completed transaction is now indicated by displaying the new credit. The plug-in unit may now be removed, and the software returns to the operation of the meter once the user selects "CL". As a precaution, it will be necessary to set a flag on completion of each of the stages (a), (b) and (c), such that if power should fail during a transaction, a later attempt will enable the software to jump to the start of the stage that was interrupted.

The post office equipment detects the presence of a plug-in unit 18 in the same way as described above, that is by detecting the known constant stored in the plug-in unit's memory. All data is read from the plug-in unit and parity is checked for errors 44. An error will be flagged on the display and, as indicated above, the operator can attempt to retrieve the data was found in error by selecting "Reset" followed by "Fault".

From the display, it is possible to determine if the fault is reset. Whether a fault occurs or not, it is possible, at this stage, to log all the plug-in unit's data on a printer by selecting "Print" 45.

If no errors are detected, the encrypted TID code is combined with the Post Office code (when entered at the keyboard 49) to form the decrypted "old TID" 46. From this, a "new TID" can be generated by applying the LFSR 43 as described above. If the transaction is the first for the given plug-in unit, the old TID code does not exist, in which case the software will expect a value to be entered at the keyboard 49, this "Initial TID" in fact replaces the "new TID". The constant used for detection of the plug-in unit in the franking machine or post office equipment can now be written in the plug-in unit's memory.

The required credit update ΔC is now entered on the keyboard 49 and is combined with the new TID code just formed and the Post Office code previously entered to perform the encryption algorithm 48. Finally, the encrypted TID Code and ΔC is error encoded 50 before being transferred to the plug-in unit's memory 36 and the transfer verified. Completion is indicated on the display.

In the event of a misplaced plug-in unit, the current TID code (which can be calculated from the Post Office's records of the old TID code) can be input to a replacement plug-in unit as though it is new, that is treated as an "Initial TID".

It will be appreciated that the plug-in unit's non-volatile memory could take the form of an embedded chip with a corresponding array of accessible connections and the housing take the form of a plastic card.

I claim:

1. An information transport system comprising:
   a transportable unit comprising:
   a non-volatile electronic memory for storing a data block comprising a transaction code and information; and memory connection means to enable data to be written into and read from said memory;

a first station including:

first connection means operatively connectable with said memory connection means of said transportable unit;

first storage means for storing a transaction code value;

writing means operable when the memory connection means and the first connection means are interconnected to write a data block to the memory of said transportable unit, said data block including information to be transported by said transportable unit from said first station to a second station and the transaction code value stored in said first storage means;

said second station comprising:

second connection means operatively connectable with said memory connection means;

second storage means for storing said transaction code value;

second interface means operable during an interconnection of the memory connection means and the second connection means to read, from the memory of said transportable unit, the data block written to said memory by said first writing means of said first station;

second verifying means operable to verify the validity of the data block read from the transportable unit by said second reading means by comparing the transaction code value of said data block with said transaction code value stored in said second storage means;

said interface means being operative during said interconnection of the memory connection means and the second connection means in response to said transaction code value of said data block being equal to said transaction code value stored in said second storage means to write data into the memory of said transportable unit so that the memory contains a second data block comprising further information for transport by the transportable unit from the second station to said first station and said transaction code value;

a second generator operative in response to said transaction code value of said data block being equal to said transaction code value stored in said second storage means to generate a new value of transaction code and to store said new value in said second storage means; and said first station further including:

reading means operable to read the second data block from the memory of the transportable unit when the memory connection means is connected with the first connection means;

first verifying means operable to verify the validity of the data block read from the transportable unit by comparing the value of the transaction code of the data block read from the memory with the value in said first storage means;

a first transaction code generator operable to generate said new value of transaction code and to store said new value in said first storage means.

2. An information transport system as claimed in claim 1 wherein said first and second stations each include means to encrypt and decrypt the data block; said data block being written to the memory in encrypted form and said data block being decrypted when read from the memory.

3. An information transport system as claimed in claim 1 wherein the transportable unit is passive and consists solely of said non-volatile electronic memory housed in a sealed casing and said memory connection means providing electrical connections to the memory from the exterior of the casing.

4. An information transport system as claimed in claim 3 wherein one of said stations includes a battery and switch means operative during reading and writing of data from and to the memory of the transportable unit at said station to connect the battery through said interconnected connection means to power said electronic memory.

5. An information transport system as claimed in claim 1 wherein said second station is a postal franking machine including a descending register to register a value of credit available for franking operations; an ascending register to register an accumulated value of franking effected; and wherein the first information relates to a value of credit update and the second information relates to values registered in said descending and ascending registers.

6. An information transport system as claimed in claim 5 wherein said first station is a postal authority centre.

7. An information transport system as claimed in claim 1 wherein said first and second generators for generating the new transaction code value each include a linear feed shift register.

8. A method of transporting information between first and second stations including the steps of:

providing a transportable unit containing a non-volatile electronic memory;

storing a transaction code value at said first and second stations;

writing a first data block comprising first information and said stored value of transaction code into the transportable unit at the first station;

transporting the transportable unit from the first to the second station;

reading the first data block from the transportable unit at the second station;

verifying validity of said data block by comparing the transaction code value in the data block with the value stored at said second station;

writing data to said memory so that the memory contains a second data block comprising second information and said transaction code value and generating and storing a new transaction code value at the second station in response to said data block being valid;

transporting the transportable unit from the second to the first station;

reading the second data block from the transportable unit at the first station;

verifying validity of said second data block by comparing the transaction code value in the second data block with the value stored at the first station; and generating and storing the new transaction code value at the first station in response to said second data block being valid.

9. A method as claimed in claim 8 including the steps of encrypting the data block and writing the data block in encrypted form to the memory; and reading the data block in encrypted form from the memory and then decrypting the data block.

10. A system as claimed in claim 1, including in said first and second stations means to add a parity signal to information written into the transportable unit and means to remove the parity signal from information read from the unit.

11. A system as claimed in claim 1, in which the non-volatile memory comprises an electrically erasable programmable read only memory.

12. A system as claimed in claim 11, in which the transportable unit receives electrical power from the station at which it is received.

* * * * *